United States Patent
Lystad

[11] 3,727,976
[45] Apr. 17, 1973

[54] VEHICLE SEAT

[75] Inventor: Leonard A. Lystad, Warren, Mich.

[73] Assignee: General Motors Corporation, Detroit, Mich.

[22] Filed: Feb. 22, 1971

[21] Appl. No.: 117,649

[52] U.S. Cl. .....................297/340, 297/379, 296/66
[51] Int. Cl. ..............................................B60n 1/04
[58] Field of Search......................297/340, 341, 379, 297/378; 296/66, 65

[56] References Cited

UNITED STATES PATENTS

| | | | |
|---|---|---|---|
| 2,826,241 | 3/1958 | Himka | 297/341 |
| 3,410,600 | 11/1968 | Thorpe | 297/379 |
| 3,529,863 | 9/1970 | Belfry | 296/66 |
| 3,338,633 | 8/1967 | Jackson | 297/379 |
| 3,398,987 | 8/1968 | Lynn | 297/379 |
| 3,550,949 | 12/1970 | Bonnaud | 297/379 |
| 3,311,405 | 3/1967 | Brennan | 296/66 |
| 2,997,335 | 8/1961 | May | 296/66 |
| 3,473,176 | 10/1969 | Taylor | 297/379 X |
| 1,947,980 | 2/1934 | Feyrer | 296/66 |
| 3,171,682 | 3/1965 | Buser | 296/66 |

*Primary Examiner*—Francis K. Zugel
*Attorney*—W. E. Finken and Herbert Furman

[57] ABSTRACT

A vehicle seat with a conventional seat cushion and seat back includes front and rear links respective each side of the seat with the respective ends of the links pivoted to the seat cushion and a vehicle body floor to mount the seat for bodily movement longitudinally of the vehicle body between a seating position and an easy enter position. A first latch mechanism mounted adjacent the upper edge of the seat back engages a vehicle body mounted keeper to hold the seat in seating position and is selectively actuatable to disengage the keeper and allow movement of the seat to easy enter position. The lower edge of the seat back is pivotally mounted on the rear links for movement about a transverse axis between the generally upright position of the seating position of the seat and a generally horizontal position defining a cargo floor and a cargo position of the seat. A second latch mechanism mounted on the seat back engages one of the rear links to prevent pivotal movement of the seat back to the generally horizontal position during movement of the seat to easy enter position. The second latch mechanism is selectively actuatable to disengage the one rear link as a control rod that extends between the latch mechanisms simultaneously actuates the first latch mechanism to allow the seat back to pivot to the horizontal position. The second latch mechanism subsequently is selectively engageable with the one rear link to maintain the seat back in the horizontal position defining the cargo position of the seat. A pin and slot connection between the first latch mechanism and one end of the control rod allows actuation of the first latch mechanism independently of the second latch mechanism.

6 Claims, 6 Drawing Figures

PATENTED APR 17 1973 3,727,976

INVENTOR.
Leonard A. Lystad
BY
Herbert Furman
ATTORNEY

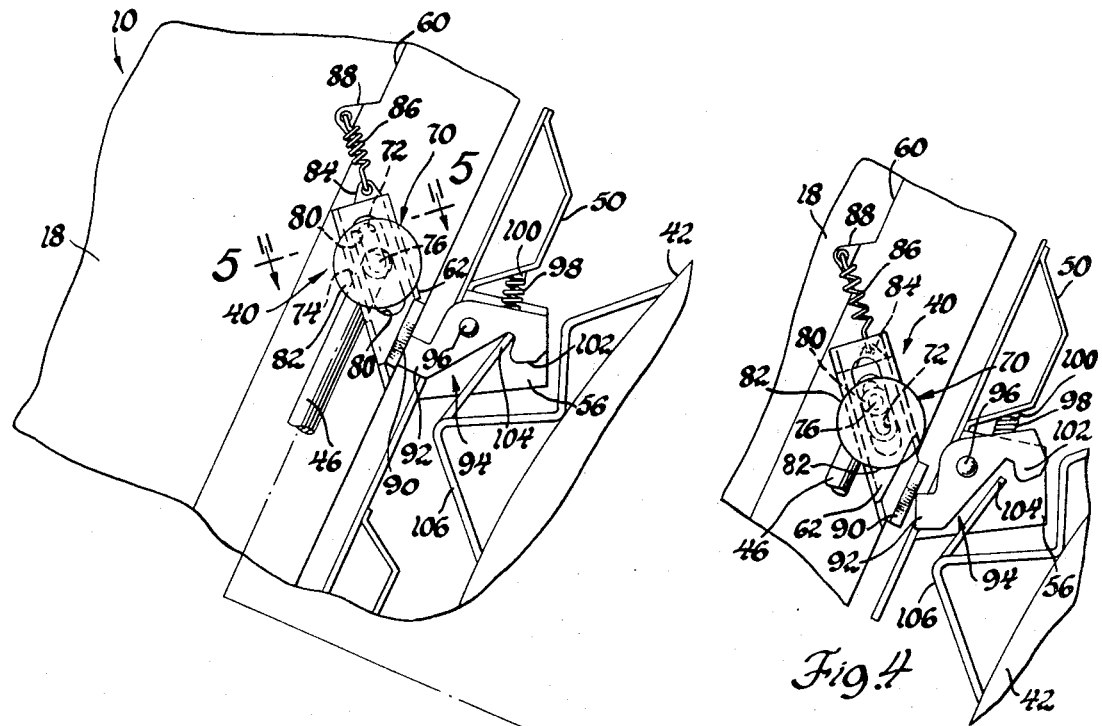
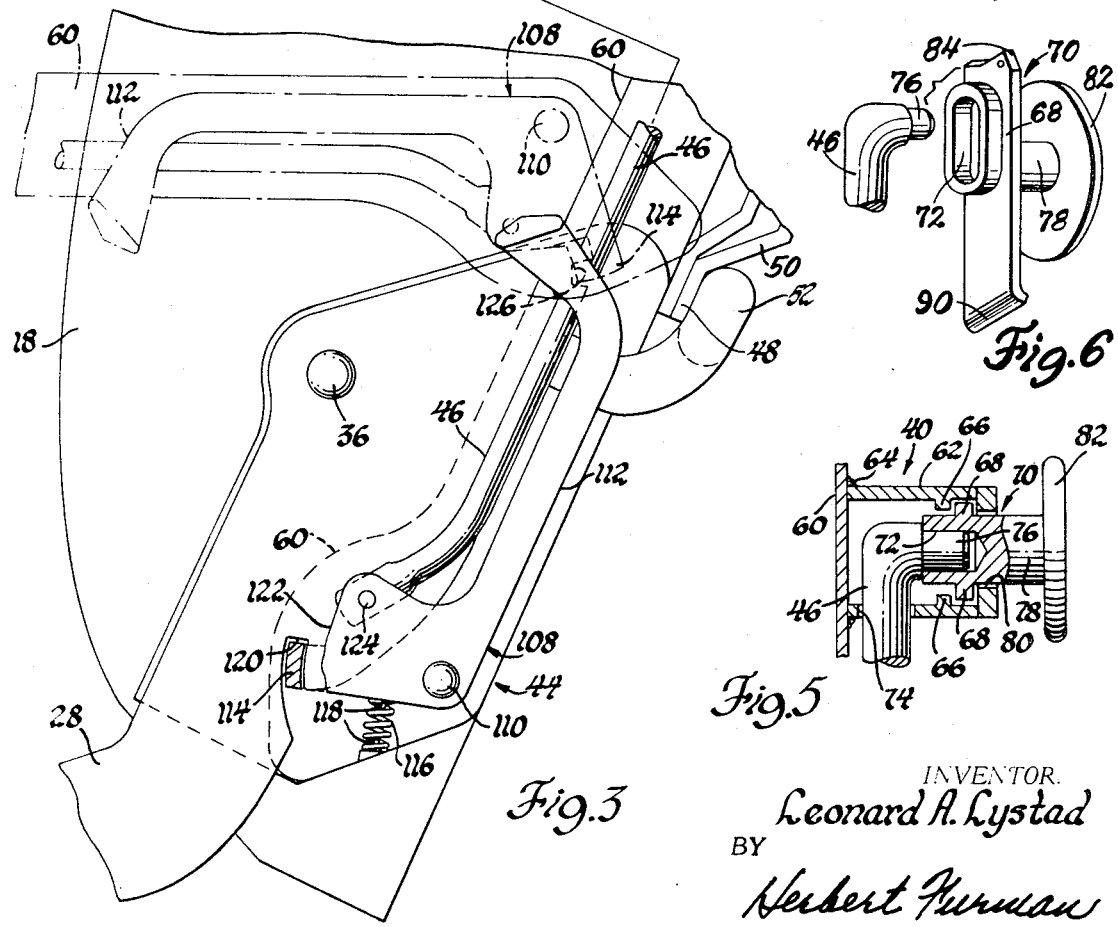

VEHICLE SEAT

This invention relates to vehicle seats and more particularly to a vehicle seat movable between a seating position, an easy enter position, and a cargo positon.

It is well known to provide a vehicle seat that is bodily movable longitudinally of the vehicle between a seating position and an easy enter position allowing access to the vehicle interior rearward of the seat. Generally, this type of seat is used as a vehicle front seat to allow access to the vehicle rear seat through the vehicle front side door opening. It is also well known to provide a vehicle rear seat in a station wagon type vehicle in which the rear seat is movable between a seating position and a cargo position where the seat back defines a cargo floor. Generally, in this type of vehicle, the rear seat is accessible through a rear side door opening. Some station wagon type vehicles include a third seat that faces rearwardly and is accessible through the rear tailgate opening. In order to provide a third seat that faces forwardly, it is necessary that the seat be accessible by way of the vehicle rear side door opening through the space normally occupied by the rear seat.

This invention provides an improved vehicle seat that is movable from the seating position to either an easy enter position, allowing access to the third seat, or to a cargo position, in which the seat back defines a cargo floor, upon actuation of first and second latch mechanisms, respectively. Accordingly, an object of this invention is to provide first and second latch mechanisms that are respectively actuatable to allow movement of a vehicle seat from a seating position to either an easy enter position or a cargo position.

Another object of this invention is to provide such latch mechanisms with a vehicle seat that bodily shifts to the easy enter position.

In carrying out these objects, links extending between the seat cushion and the vehicle body floor mount the seat for bodily movement longitudinally of the vehicle between the seating position and the easy enter position. The seat is maintained in the seating position by a first latch mechanism that is selectively actuable to allow movement of the seat to the easy enter position. The seat back is mounted for movement between the generally upright position of the seating position of the seat and a generally horizontal position defining a cargo floor and the cargo position of the seat. A second latch mechanism prevents movement of the seat back from the upright position to the generally horizontal position and is selectively actuatable to allow such movement.

In the preferred embodiment, the first latch mechanism is mounted adjacent the top edge of the seat back and engages a vehicle body mounted keeper to hold the seat in the seating position. The second latch mechanism is mounted adjacent the lower edge of the seat back an is engageable with one of the links to prevent pivotal movement of the seat back to the generally horizontal position during movement of the seat to the easy enter position. A control rod extends between the latch mechanisms to simultaneously actuate the first latch mechanism upon actuation of the second latch mechanism while a pin and slot connection between the control rod and one of the latch mechanisms allows actuation of the first latch mechanism independently of the second latch mechanism.

Other objects, features and advantages of this seat will be readily apparent from the following specification and drawings in which.

Figure 1:
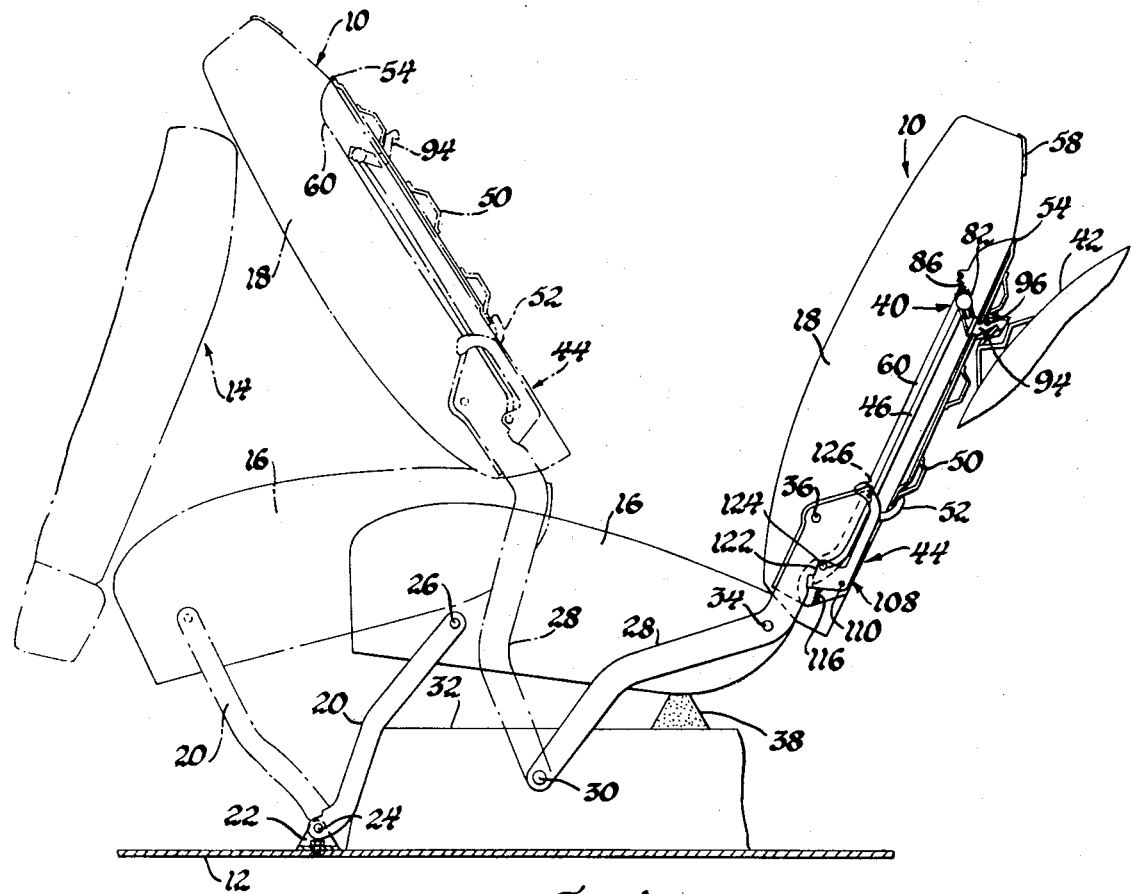
FIG. 1 is a partially broken away sctional view through a vehicle body including a seat, according to the invention shown in a solid line indicated seating position and a phantom line indicated easy enter position.

FIG. 3 is an enlarged view of portions of FIG. 1 showing the first latch mechanism adjacent the upper edge of the seat back in a latched position and showing the second latch mechanism adjacent the lower edge of the seat back in a solid line indicated latched position preventing movement of the seat to the cargo position and in a phantom line indicated latched position maintaining the seat in cargo position;

FIG. 4 is a view of the first latch mechanism similar to that of FIG. 3 but in an unlatched position;

FIG. 5 is an enlarged sectional view of a portion of the seat back and first latch mechanism taken generally along line 5—5 of FIG. 3; and FIG. 6 is an exploded perspective view of the latch components shown in FIG. 5.

Referring to the drawings, and more particularly to FIG. 1, a vehicle seat 10 according to the invention is mounted within a vehicle that includes a floor 12 and a front seat 14 shown by phantom lines. The seat 10 includes a conventional seat cushion 16 and seat back 18. Symmetrical left and right-hand front links 20 have their lower ends pivoted to floor mounted lugs 22 by pins 24 and have their upper ends pivoted to seat cushion 16 by pins 26. Left and right-hand rear links 28, which are symmetrical except as will be noted, have their lower ends pivoted by pins 30 to a raised abutment 32 of floor 12. Intermediate their ends, links 28 are pivoted by pins 34 to seat cushion 16. At their upper ends, the links 28 are pivoted by pins 36 to the seat back 18. With the seat in the FIG. 1 solid line indicated seating position, the lower rearward edge of seat cushion 16 is gravity biased into engagement with a resilient bumper 38 mounted on abutment 32 to prevent the seat cushion 16 from moving rearwardly of the seating position and the links 20 and 28 from pivoting clockwise about pins 24 and 30, respectively. While it is not shown in the drawings, the preferred embodiment also includes suitable vehicle body mounted bumpers that engage the seat back 18 and cooperate with bumper 38 in positioning seat 10 in seating position.

A first latch mechanism generally indicated at 40 includes a bolt that is selectively engageable with a striker mounted on a wheel well 42, as will be more fully hereinafter described, to prevent bodily movement of the seat 10 forwardly from the seating position. Latch mechanism 40 is actuatable to disengage the striker and release the seat 10 for bodily movement forwardly from the seating position to the phantom line indicated easy enter position which allows occupant egression from and ingression to the vehicle interior rearward of seat 10. During this bodily movement, links 20 and 28 pivot counterclockwise about pins 24 and 30, respectively, and a second latch mechanism generally indicated at 44 prevents pivoting of seat back 18 about pins 36 to maintain the seat back 18 in a fixed position relative to links 28 as will be described.

Figure 2:
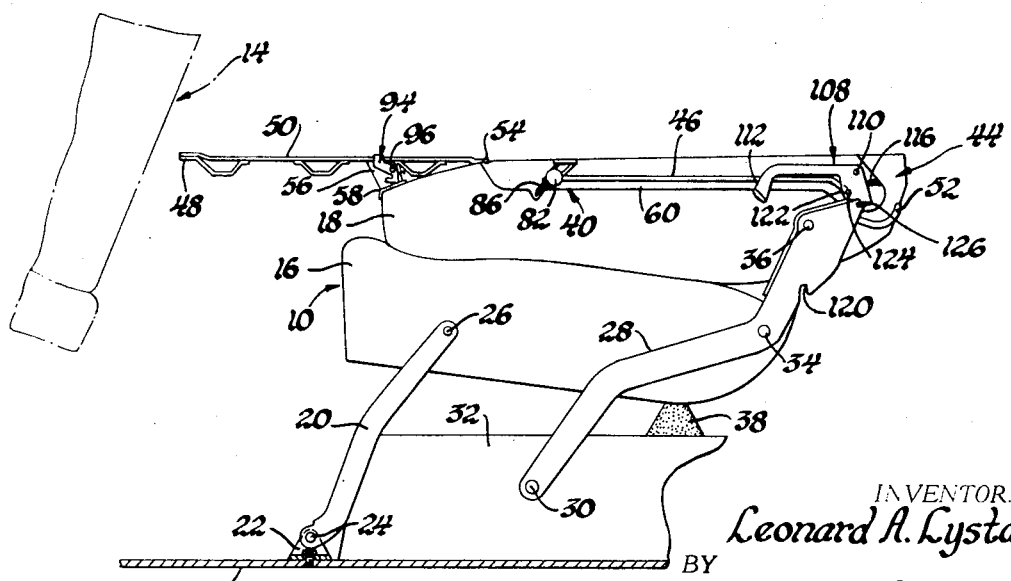
FIG. 2 is a view similar to FIG. 1 but with the seat in a cargo positon.

Referring additionally now to FIG. 2, actuation of the second latch mechanism 44, as will be more fully hereinafter described, simultaneously actuates the first latch mechanism 40 by way of a control rod 46 and allows the seat back 18 to pivot about the pins 36. The seat back 18 is then movable from the generally upright position of the seating position to the generally horizontal position of FIG. 2 in which the upper side of the seat back 18 defines a cargo floor and a cargo position of the seat. As the seat back 18 pivots forwardly to the horizontal position, laterally outwardly extending tabs 48 of a filler panel 50 move out of engagement with laterally inwardly extending tabs 52 mounted on the rear links 28. This allows the filler panel 50 to pivot forwardly about its pivotal attachment 54 to seat back 18 to the FIG. 3 position in which a filler panel mounted spacer 56 engages a seat back mounted plate 58 to position the filler panel 50. The seat 10 is maintained in this cargo position by the second latch mechanism 44 in a manner to be more fully hereinafter described.

Referring additionally now to FIGS 3 through 6, a generally elongated plate 60 extends along the lateral rearward edge of the seat back 18 and provides for mounting of the latch mechanisms 40 and 44

Latch mechanism 40 includes a channel member 62 whose walls are secured to plate 60 by welds 64, FIG. 5, to support the channel member with its longitudinal axis slightly tipped relative to the vertical when the seat back 18 is in the generally upright position of the seating position, FIG. 3. As also seen in FIG. 5, the inner sides of the walls of the channel member include track lugs 66 that extend longitudinally of the channel member and cooperate with the base wall of the channel member to define opposed U-shaped tracks which receive respective ears 68 of a slide member 70. The slide member 70 is thus mounted for sliding movement relative to the longitudinal axis of channel member 62. Slide member 70 includes a slot 72 that opens to the left, as in FIG. 5, and extends longitudinally of the slide member. The upper end of control rod 46 extends through an aperture 74 in the lower wall of channel member 62. Within the channel member 62, control rod 46 is turned at 90° and includes a reduced diameter pin 76 received within the slot 72 in slide member 70. The slot 72 and pin 76 provide a pin and slot connection between the control rod 46 and the latch mechanism 40 to coordinate the actuation of the latch mechanisms, as will be described. Slide member 70 also includes a shank 78 that extends through an elongated aperture 80 in the channel member and supports a knob 82 that provides for manual actuation of latch mechanism 40. An apertured lug 84 is suitably mounted on the upper end of slide member 70 and is attached to one end of a spring 86 whose other end is attached to an apertured lug 88 on plate 60. Spring 86 biases slide member 70 to the FIG. 3 unactuated position in which shank 78 is in engagement with the upper end of aperture 80. The lower end of slide member 70 includes a laterally extending tab 90 which extends outwardly of channel member 62 through its open lower end. Tab 90 engages an actuating nose 92 of a bolt 94 which is pivoted to spacer 56 by a pin 96 to pivotally mount the bolt on the filler panel 50. A spring 98 extends between seats 100 on the filler panel 50 and the bolt 94 to bias the bolt clockwise about pin 96 with the nose 92 engaging tab 90 and with a hooked nose 102 engaging a keeper 104 of a bracket 106 mounted on the wheel well 42.

To move the seat 10 from the FIG. 1 seating position to the phantom line indicated easy enter position allowing agression from and ingression to the vehicle interior rearward of seat 10, an occupant manually engages knob 82 with one hand and the upper edge of seat back 18 with the other hand. A downward force applied to knob 82 causes slide member 70 to move longitudinally of channel member 62 from the FIG. 3 unactuated position to the FIG. 4 actuated position. This movement causes tab 90 to move the actuating nose 92 and pivot the bolt 94 counterclockwise about pin 96 such that the hooked nose 102 is free of the keeper 104. The occupant then uses the other hand to move the seat 10 to the easy enter position as was described. It should be noted that during the manual actuation of the latch mechanism 40, the pin 76 of control rod 46 slides from the lower end of slot 72, FIG. 3, to the upper end, FIG. 4, such that control rod 46 does not move relative to the second latch mechanism 44. The pin and slot connection between control rod 46 and latch mechanism 40 thus allows actuation of latch mechanism 40 independently of latch mechanism 44.

As best seen in FIG. 3, latch mechanism 44 includes a member 108 pivoted to plate 60 by a pin 110. Member 108 includes an integral handle portion 112 and an integral bolt portion 114. A spring 116 extends between seats 118 on plate 60 and member 108 to bias member 108 clockwise about pin 110 such that bolt portion 114 is received within a downwardly opening slot 120 in one of the rear links 28. The bolt portion 114 engages the upper edge of slot 120 to position member 108 in the FIG. 3 solid line indicated position thus preventing pivotal movement of the seat back 18 about pins 36 and thus fixing the seat back with respect to rear links 28 during movement of the seat from the seating position to the easy enter position. The member 108 also includes an integral lug 122 to which is pivoted the lower end of control rod 46 by a pin 124 to coordinate the latch mechanisms 40 and 44 as will be described.

To move the seat 10 from the seating position of FIG. 1 to the cargo position of FIG. 2, an occupant engages the top of the seat back 18 with one hand and the handle portion 112 with the other hand. A counterclockwise force applied to the handle portion 112 rotates the member 108 about pin 110 and moves the bolt portion 114 out of slot 120. This movement also causes control rod 46 to bodily shift downwardly. With the seat in seating position, pin 76 is located at the bottom of slot 72 in slide member 70. Consequently, the downward bodily shifting movement of control rod 46 causes the pin 76 to move the slide member 70 downwardly and to the right to pivot the bolt member 94 counterclockwise about pin 96 and out of engagement with keeper 104. Actuation of the latch mechanism 44, therefore, simultaneously actuates latch mechanism 40 and allows the occupant to pivot the seat counterclockwise about pins 36 to the FIG. 2 cargo position. When the seat back 18 reaches the generally horizontal position of the cargo position, the bias of spring 116 causes the bolt portion 114 to be received within an upper slot 126 in the one rear link 28 as best shown by the phantom line indicated position of FIG. 3. The seat back 18 is thus prevented from pivoting clockwise about pins 36 and the seat 10 is thus maintained in the cargo position with the filler panel extending forwardly as in FIG. 2 as was previously described.

It should be noted that although the rear links 28 are symmetrical with one another, the other rear link 28 does not necessarily include the slots 120 and 126 for cooperation with an associated latch mechanism such as latch mechanism 44.

To move the seat from the FIG. 2 cargo position to the seating position, the filler panel 50 is rotated 180° clockwise about its pivotal attachment 54 into engagement with the seat back 18. A force is then applied to the handle portion 112 to pivot the member 108 counterclockwise about pin 110 thus moving the bolt portion 114 out of slot 126. The seat back 18 is then pivoted clockwise about pins 36 until it reaches the generally upright position of FIG. 1. During this movement, the filler panel mounted tabs 48 move into engagement with the rear link supported tabs 52 to position the filler panel 50 and its associated bolt 94 such that the bolt engages keeper 104 as in FIG. 3 to maintain the seat in seating position. Subsequently, the spring 116 moves the bolt portion 114 into slot 120 of the one rear link 28 to fix the seat back 18 with respect to the links 28.

The invention thus provides an improved vehicle seat movable between a seating position, an easy enter position, and a cargo position and also provides first and second latch mechanisms that are respectively actuatable to allow movement of the seat from seating position to either easy enter position or cargo position.

What is claimed is:

1. In a vehicle body including a floor and a seat having a seat cushion and a seat back, the combination comprising, linkage means extending between the floor and the seat cushion and mounting the seat for bodily movement longitudinally of the vehicle body between a seating position and an easy enter position, first latch means extending between the seat back and the vehicle body for maintaining the seat in seating position and selectively actuatable to allow movement of the seat to easy enter position, means mounting the seat back relative to the seat cushion for movement between the generally upright position of the seating position and a generally horizontal position defining a cargo floor and a cargo position of the seat, second latch means for maintaining the seat back in the upright position and selectively actuatable to allow movement of the seat back to the generally horizontal position defining the cargo position of the seat, and control means for actuating the first latch means upon actuation of the second latch means to allow movement of the seat back to the generally horizontal position defining the cargo position of the seat.

2. In a vehicle body including a floor and a seat having a seat cushion and a seat back, the combination comprising, linkage means extending between the floor and the seat cushion and mounting the seat for bodily movement longitudinally of the vehicle body between a seating position and an easy enter position, first latch means extending between the seat back and the vehicle body for maintaining the seat in seating position and selectively actuatable to allow movement of the seat to easy enter position, means pivotally mounting the seat back relative to the seat cushion for movement between the generally upright position of the seating position and a generally horizontal position defining a cargo floor and a cargo position of the seat, second latch means for maintaining the seat back in the generally upright position of the seating position and selectively actuatable to allow movement of the seat back to the horizontal position defining the cargo position of the seat, and control means extending between the first and second latch means and allowing actuation of the first latch means independently of the second latch means to prevent pivotal movement of the seat back to the generally horizontal position during movement of the seat to easy enter position, the control means actuating the first latch means upon actuation of the second latch means to allow pivotal movement of the seat back to the generally horizontal position defining the cargo position of the seat.

3. In a vehicle body including a floor and a seat having a seat cushion and a seat back, the combination comprising, front and rear links respective each side of the seat cushion and having respective ends thereof pivoted to the floor and the seat cushion to mount the seat for bodily movement longitudinally of the vehicle body between a seating position and an easy enter position, first latch means mounted on the seat back and engageable with the vehicle body to maintain the seat in seating position, the first latch means being selectively actuatable to disengage the vehicle body and allow movement of the seat to easy enter position, means on the rear links pivotally mounting the seat back for movement between the generally upright position of the seating position and a generally horizontal position defining a cargo floor and a cargo position of the seat, second latch means mounted on the seat back and engageable with one of the rear links to fix the seat back with respect to the rear links, the second latch means being selectively actuatable to disengage the one rear link and to allow pivotal movement of the seat back to the generally horizontal position defining the cargo position of the seat, and control means extending between the first and second latch means and allowing actuation of the first latch means independently of the second latch means to prevent pivotal movement of the seat back to the generally horizontal position during movement of the seat to easy enter position, the control means actuating the first latch means upon actuation of the second latch means to allow movement of the seat back to the generally horizontal position defining the cargo position of the seat.

4. The combination of claim 3 wherein the second latch means is engageable with the one rear link to maintain the seat back in the generally horizontal position defining the cargo position of the seat.

5. In a vehicle body including a floor and a seat having a seat cushion and a seat back, the combination comprising, front and rear links respective each side of the seat cushion and having respective ends thereof pivoted to the floor and the seat cushion to mount the seat for bodily movement longitudinally of the vehicle body between a seating position and an easy enter position, first latch means mounted on the seat back and engageable with the vehicle body to maintain the seat in seating position, the first latch means being selectively actuatable to disengage the vehicle body and allow movement of the seat to easy enter position, means on the rear links pivotally mounting the seat back for movement between the generally upright position of the seating position and a generally horizontal position defining a cargo floor and a cargo position of the seat, second latch means mounted on the seat back and engaging one of the rear links to fix the seat back with respect to the rear links, the second latch means being selectively actuatable to disengage the one rear link allowing pivotal movement of the seat back to the generally horizontal position defining the cargo position of the seat, a control rod extending between the first and second latch means, means pivotally connecting one end of the control rod to one of the latch means, and pin and slot means connecting the other end of the control rod to the other latch means, direct actuation of the first latch means causing the other end of the control rod to slide relative to the other latch means at the pin and slot means to allow actuation of the first latch means independently of the second latch means and prevent pivotal movement of the seat back to the generally horizontal position during movement of the seat to easy enter position, the control rod secondarily actuating the first latch means upon actuation of the second latch means to allow pivotal movement of the seat back to the generally horizontal position defining the cargo position of the seat.

6. The combination of claim 5 wherein the second latch means is engageable with the one rear link to maintain the seat back in the generally horizontal position defining the cargo position of the seat.

* * * * *